United States Patent
Kloppenburg et al.

(10) Patent No.: US 9,845,366 B2
(45) Date of Patent: *Dec. 19, 2017

(54) HIGH-MOONEY NDBR HAVING MOONEY JUMP

(71) Applicant: ARLANXEO Deutschland GmbH, Dormagen (DE)

(72) Inventors: Heike Kloppenburg, Duesseldorf (DE); Thomas Gross, Wuelfrath (DE); Alex Lucassen, Sassveld (NL); Dave Hardy, Leiderdorp (NL); Yan Zhang, Leverkusen (DE); Alicia Le-Sattler, Bochum (DE)

(73) Assignee: ARLANXEO Deutschland GmbH, Dormagen (DE)

( * ) Notice: Subject to any disclaimer, the term of this patent is extended or adjusted under 35 U.S.C. 154(b) by 183 days.

This patent is subject to a terminal disclaimer.

(21) Appl. No.: 14/405,814

(22) PCT Filed: Jun. 18, 2013

(86) PCT No.: PCT/EP2013/062656
§ 371 (c)(1),
(2) Date: Dec. 5, 2014

(87) PCT Pub. No.: WO2013/189947
PCT Pub. Date: Dec. 27, 2013

(65) Prior Publication Data
US 2015/0252126 A1 Sep. 10, 2015

(30) Foreign Application Priority Data

Jun. 18, 2012 (EP) ..................................... 12172485

(51) Int. Cl.
| | |
|---|---|
| C08F 36/06 | (2006.01) |
| C08F 136/06 | (2006.01) |
| C08C 19/20 | (2006.01) |
| C08C 19/00 | (2006.01) |
| C08L 15/00 | (2006.01) |
| C08L 9/00 | (2006.01) |
| C08F 236/06 | (2006.01) |

(52) U.S. Cl.
CPC ............ *C08F 136/06* (2013.01); *C08C 19/00* (2013.01); *C08C 19/20* (2013.01); *C08L 15/00* (2013.01); *C08F 36/06* (2013.01); *C08F 236/06* (2013.01); *C08L 9/00* (2013.01)

(58) Field of Classification Search
CPC ...... C08F 36/06; C08F 136/06; C08F 236/06; C08L 9/00; C08L 15/00; C08C 19/00; C08C 19/20; C08K 2003/3009; C08K 3/16; C08K 5/09; C08K 5/10

USPC ................................ 525/332.4, 333.1, 333.2
See application file for complete search history.

(56) References Cited

U.S. PATENT DOCUMENTS

| | | | |
|---|---|---|---|
| 3,374,191 A | 3/1968 | Nutzel | |
| 3,978,103 A | 8/1976 | Meyer-Simon et al. | |
| 4,076,550 A | 2/1978 | Thurn et al. | |
| 4,260,707 A | 4/1981 | Sylvester et al. | |
| 5,567,784 A * | 10/1996 | Wieder ................... | C08C 19/20 526/153 |
| 5,663,226 A | 9/1997 | Scholl et al. | |
| 6,268,421 B1 | 7/2001 | Dittrich et al. | |
| 6,383,971 B1 | 5/2002 | Windisch | |
| 6,399,726 B1 | 6/2002 | Windisch et al. | |
| 6,417,285 B2 | 7/2002 | Giebeler et al. | |
| 6,576,731 B2 | 6/2003 | Steinhauser et al. | |
| 7,112,632 B2 | 9/2006 | Viola et al. | |
| 2001/0014720 A1 | 8/2001 | Giebeler et al. | |
| 2006/0089472 A1 | 4/2006 | Viola et al. | |

FOREIGN PATENT DOCUMENTS

| | | |
|---|---|---|
| DE | 19544469 A | 3/1997 |
| EP | 0011184 A1 | 5/1980 |
| EP | 0127236 A1 | 12/1984 |
| JP | 2013231156 A | 11/2013 |

OTHER PUBLICATIONS

Encyclopedia of Polymers Science and Engineering, vol. 4, pp. 66-79 ff (Compounding), 1986.
Encyclopedia of Polymers Science and Engineering, vol. 17, pp. 666-698 ff (Vulcanization).
European Search Report from co-pending Application EP12172485, dated Nov. 5, 2012, 2 pages.

* cited by examiner

*Primary Examiner* — Roberto Rabago

(57) ABSTRACT

The invention relates to methods for achieving a step increase in the Mooney viscosity in production of high-molecular-weight polybutadiene having >95% by weight content of cis-1,4 units and <1% by weight 1,2-vinyl content, characterized in that 1) at least one monomer selected from butadiene and/or isoprene is polymerized at temperatures of from −20° C. to 150° C. in the presence of at least one inert, organic solvent and in the presence of at least one catalyst based on neodymium carboxylate,
2) the polymerization is then terminated by addition of protic compounds and
3) then sulphur chlorides are added to the polymer, and prior to addition these sulphur chlorides are treated with a carboxylic acid, fatty acid and/or fatty acid ester.

23 Claims, 1 Drawing Sheet

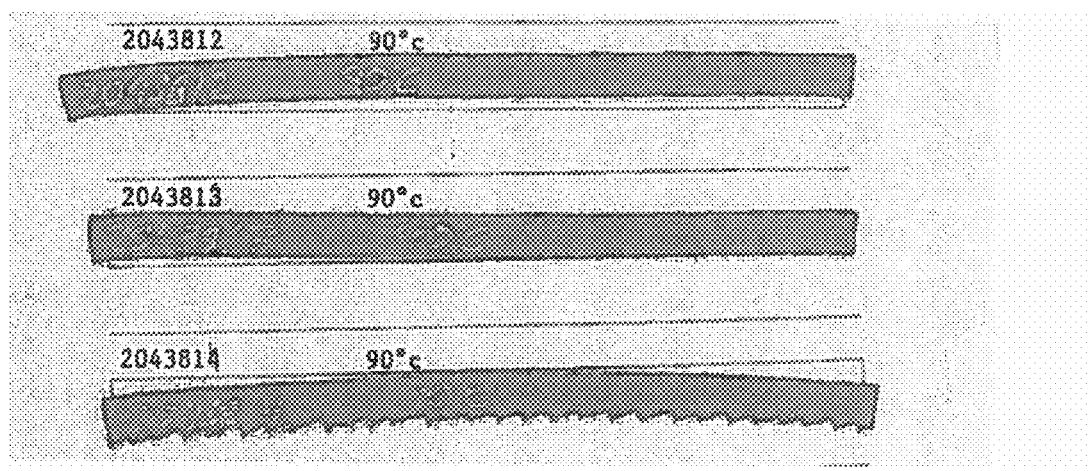

HIGH-MOONEY NDBR HAVING MOONEY JUMP

The invention relates to a method for achieving a step increase in the Mooney viscosity in production of high-molecular-weight polybutadiene having high content >95% by weight of cis-1,4 units and having low 1,2-vinyl content <1% by weight.

BACKGROUND INFORMATION

Polybutadienes are used as important constituents of rubber mixtures in the tyre industry, and it is desirable here to achieve an improvement in final properties, for example a reduction in rolling resistance and in abrasion value. Another application sector is provided by golf-ball cores or shoe soles, where high rebound resilience is a primary concern.

Polybutadienes having high content of cis-1,4 units have been produced on a large industrial scale for quite some time and are used for the production of tyres and of other rubber products, and also for impact-modification of polystyrene.

High content of cis-1,4 units is currently achieved almost exclusively by using catalysts based on compounds of the rare earth metals, as described by way of example in EP-A 1 0 011 184 and EP-B-A1 0 007 027.

It is known from the prior art that specifically neodymium-catalysed polybutadienes within the high-cis polybutadienes group have particularly advantageous properties in relation to rolling resistance, abrasion value and rebound resilience. The catalyst systems used play an important part in the production of polybutadienes.

By way of example, the neodymium catalyst used in industry is a Ziegler/Natta system composed of a plurality of catalyst components. Catalyst formation mostly involves formation of different catalyst centres, resulting in at least bimodal molar mass distribution in the polymer. The known 3 catalyst components in the Ziegler/Natta catalyst system are mostly composed of a neodymium source, a chloride source and an organoaluminium compound, these being mixed under particular temperature conditions in a very wide variety of ways, whereupon the catalyst system is prepared, with or without ageing, for the polymerization process.

The prior art discloses a plurality of production processes for Ziegler/Natta catalyst systems used for the production of polybutadienes.

Another document known from the prior art is EP 0 127 236, in which the catalyst is produced via mixing of neodymium oxides and neodymium alcoholates, and of carboxylates, with organometallic halides, and also with an organic compound at a temperature of from 20° C. to 25° C. It is also possible to mix the said 4 components at from 50° C. to 80° C. In this variant, the mixture is cooled to from 20 to 25° C., and then DIBAH is added. There is no mention of ageing.

EP 1 176 157 B1 discloses a process for the production of polybutadienes with reduced solution viscosity/Mooney viscosity ratio, in which catalyst production uses a preforming process. Here, the neodymium versatate is first mixed at 50° C. with DIBAH and isoprene, this mixture is then cooled to 5° C., and then ethylaluminium sesquichloride (EASC) is added. The ageing can take from a number of minutes to a number of days at a temperature of from 10° C. to −80° C. During the polymerization process, comonomers, for example a bisdiene, are added in order to increase the degree of branching of the polymer and thus also to obtain the very restricted solution viscosity/Mooney viscosity ratio. Because of the coupling by way of the bisdiene, the number of free chain ends per molecule in the resultant branched polymer is at least 4, whereas in linear molecules it is only 2.

The number of chain ends in the polymer is directly correlated with energy dissipation. As the number of free chain ends increases, energy dissipation through the polymer also increases. However, as energy dissipation in the polymer decreases, the rolling resistance of the polymer also decreases by way of example, and its rebound resilience improves. For identical molar mass, therefore, the final properties of a linear polymer having only 2 chain ends per molecule are accordingly always better than those of a branched polymer.

Commercially produced polymers are known to have a statistical molar mass distribution, and the breadth of the molar mass distribution here is influenced by the catalyst-production process.

The expression "step increase in Mooney viscosity" and similar expressions such as "step increase in Mooney value" or "Mooney jump" refer to techniques which significantly increase the Mooney viscosity of the polymers.

Capability to increase the molecular weight of elastomeric unsaturated diene polymers is important for various reasons. This permits initial production of low-molecular-weight parent polymers, with the great advantage, in the solution polymerization techniques usually used, of introducing lower viscosities in the "cement" (solution of the polymer in the organic-solvent medium used in the polymerization process), and of permitting operation with higher solids contents in the "cement", since better heat transfer is achieved. It is also possible to reduce the cold flow of these diene polymers, thus increasing their capability for oil-extension.

It is well known from the prior art that use of solution polymerization methods for direct production of high-molecular-weight polymers, in particular high-molecular-weight neodymium-catalysed polybutadiene, is particularly difficult and uneconomic because of high solution viscosities. There are difficulties with stirring. Other phenomena are heterogeneity in the polymerization system and drastically reduced heat transfer. The direct polymerization process extending to high molecular weights would therefore necessitate lower rates of polymer production due to reduced solids content in the reaction space. This type of procedure increases the costs of polymer production considerably.

Although it is known a preforming process can alter the catalytic effect of Nd catalysts, and these preformed Nd catalysts give polymers with relatively low cold flow, the preforming process mostly reduces the activity of the catalyst, and neodymium consumption therefore sometimes rises considerably.

It is moreover known that polydienes with low cold flow can be produced if the diene polymers are treated after the polymerization process with disulphur dichloride, sulphur dichloride, thionyl chloride, disulphur dibromide or thionyl bromide (German Auslegeschrift 12 60 794). However, the method described in German Auslegeschrift 12 60 794 for the production of elastomeric diene polymers is that the said process is unsuitable for high-molecular-weight neodymium-catalysed polybutadiene if the step increase in Mooney value is to be at least 50% greater than the Mooney viscosity of the polymer after the polymerization process, because the "step-increase polymer" exhibits gelling, and this reduces reactor operating time, because of deposits on the internal walls of the reactor. The maintenance and cleaning of the reactors is time-consuming and expensive. There is moreover the risk that gel content is present in the actual polymer, which therefore cannot then be used for tyre applications.

DE 44 36 059 A1 likewise describes a method for achieving a step increase in the molecular weight of Nd-catalysed diene rubbers, where the intrinsic odour of the polymer is reduced via a depressurization step after the polymerization process, in order to remove all of the low-boiling-point constituents of the reaction mixture. The step increase in Mooney value here is about 27% greater than the Mooney viscosity of the diene rubber after the polymerization process.

The object of the present invention therefore consists in providing a simple, effective and economic process for achieving a step increase in Mooney viscosity, where the step increase in Mooney viscosity is at least 50% greater than the Mooney viscosity of the polymer after the polymerization process and at the same time exhibits no gelling or no significant gelling.

SUMMARY

A process of the type mentioned in the introduction is proposed in order to achieve the object, and comprises
1) at least one monomer selected from butadiene or isoprene is polymerized at temperatures of from −20° C. to 150° C. in the presence of at least one inert, organic solvent and in the presence of at least one catalyst based on neodymium carboxylate,
2) the polymerization is then terminated by addition of protic compounds and
3) then sulphur chlorides are added to the polymer, and prior to addition this sulphur chloride is treated with a carboxylic acid, fatty acid and/or fatty acid ester.

BRIEF DESCRIPTION OF THE DRAWINGS

FIG. 1 shows comparative results of Garvey extrudates of a rubber according to an inventive embodiment and rubbers of comparative examples.

DESCRIPTION OF THE EMBODIMENTS

Another term used for addition of sulphur chlorides to the polymer is "modification" of the polymer.

Surprisingly, it was found that the treatment of the sulphur chlorides prior to addition with a carboxylic acid, fatty acid and/or fatty acid ester permits achievement of a greater "step-increase reaction" or modification, without any resultant undesired gelling.

It is assumed—although without any intention to adopt any particular theory—that the treatment with a carboxylic acid, fatty acid, and/or fatty acid ester improves the solubility of the sulphur chloride in the polymerization solvent, in particular hexane, and thus ensures uniform distribution of the sulphur chloride in the polymer, thus permitting avoidance, or at least reduction, of local crosslinking. This means avoidance or reduction of gelling. It is thus possible to control the reactivity of the sulphur chloride.

Surprisingly, it has been found that the gel content of the polybutadiene produced by the claimed method is preferably smaller than 1% by weight, with preference smaller than 03% by weight, particularly preferably smaller than 0.2% by weight. The method for gel content determination is described below.

Terminology used will now be explained:
Initial Mooney viscosity: Mooney viscosity (ML 1+4 100° C.) after polymerization of the polymer, i.e. after step 2).
Final Mooney viscosity: Mooney viscosity (ML 1+4 100° C.) after modification or after step increase in Mooney value or step-increase reaction of the polymer (step-increase polymer), i.e. after step 3).
Step-increase polymer: high-molecular-weight polybutadiene after modification, after the step increase in Mooney value or after the step-increase reaction.

It is preferable to use Ziegler-Natta catalysts based on compounds of the rare earth metals, for example cerium compounds, lanthanum compounds, praseodymium compounds, gadolinium compounds or neodymium compounds, where these are soluble in hydrocarbons. It is particularly preferable to use the corresponding salts of the rare earth metals as Ziegler-Natta catalysts, examples being neodymium carboxylates, in particular neodymium neodecanoate, neodymium octanoate, neodymium naphthenate, neodymium 2,2-diethylhexanoate or neodymium 2,2-diethylheptanoate, or else the corresponding salts of lanthanum or of praseodymium. The Ziegler-Natta catalysts that can be used also comprise catalyst systems based on metallocenes, as described by way of example in EP-A 1025136 and EP-A 1078939.

It is preferable that the claimed method is based on the following steps:
a) catalyst production with or without a preforming process with use of catalyst systems based on neodymium composed of
   component A: an alcoholate or a carboxylate of neodymium, preferably neodymium versatate,
   component B: a dialkylaluminium hydride, preferably diisobutylaluminium hydride (DIBAH),
   component C: a diene, preferably butadiene or isoprene and
   component D: at least one organometallic halide, preferably ethylaluminium sesquichloride (EASC),
b) polymerization of the monomers at a temperature of from −20° C. to 150° C.,
c) use or protic compounds to terminate the polymerization and
d) addition of sulphur chlorides, where the sulphur chlorides are treated with a carboxylic acid, fatty acid and/or fatty acid ester prior to addition.

Dienes that can be used are butadiene, isoprene, pentadiene and 2,3-dimethylbutadiene, in particular butadiene and isoprene. The dienes mentioned can be used either individually or else in a mixture with one another, thus producing either homopolymers or copolymers of the dienes mentioned.

Once the catalyst system has been produced, the polymerization process is implemented in organic solvents. These solvents must be inert to the catalyst system used. Examples of suitable materials are aromatic, aliphatic and cycloaliphatic hydrocarbons such as benzene, toluene, pentane, n-hexane, isohexane, heptane, isomeric pentanes and cyclohexane. These solvents can be used individually or in combination. Preference is given to cyclohexane and n-hexane. Blending with polar solvents is equally possible.

The amounts used of the inert, organic solvents are from 200 to 900 parts by weight, based on 100 parts by weight of monomers. Preference is given to amounts of from 300 to 500 parts by weight.

The polymerization process can be carried out either continuously or batchwise.

The polymerization process is carried out at a temperature of from −20° C. to 150° C., preferably from 0 to 130° C.

The polymerization process can use conventional methods and can comprise one or more stages, batchwise or continuously. Preference is given to the continuous procedure in a reactor cascade composed of a plurality of reactors, preferably at least 2, in particular from 2 to 6.

Once the desired conversion has been achieved, the catalyst is usually deactivated via addition of protic compounds. i.e. the polymerization process is terminated. The amount of protic compounds is preferably from 0 to 1 phr, based on monomer used.

It is preferable that the protic compounds involve carboxylic acids and/or fatty acids.

It is preferable to use stearic acid or lauric acid for the deactivation of the polymerization process.

It is moreover possible, once the desired conversion has been achieved, to react the catalyst with one or more reactive polar organic compounds which, after the reaction with the catalyst, can be attached as functional terminal group to the polymer chain.

It is equally possible, although not essential, to carry out a depressurization step after the polymerization process, in order to remove all of the low-boiling point constituents of the polymer.

Sulphur chlorides are admixed with the resultant polymer, and these sulphur chlorides are pretreated with carboxylic acid, fatty acid and/or fatty acid ester. For the pretreatment, carboxylic acid, fatty acid and/or fatty acid ester is admixed with the sulphur chlorides.

The quantitative ratio of sulphur chlorides used in relation to carboxylic acid, fatty acid and/or fatty acid ester is preferably from 1:0.01 to 1:10.

It is preferable that the carboxylic acid involves selected compounds from the group of the carboxylic acids having from 8 to 20 carbon atoms, an example being versatic acid, octanoic acid or isooctanoic acid.

It is preferable that the fatty acid involves saturated or mono- or polyunsaturated vegetable or animal fatty acids, such as lauric acid, myristic acid, palmitic acid or oleic acid.

It is preferable that the fatty acid ester involves natural or modified, saturated or mono- or polyunsaturated vegetable or animal fatty acid esters, such as epoxidized soybean oil (ESBO).

It is preferable that the sulphur chlorides involve disulphur dichloride, sulphur dichloride and/or thionyl chloride. It is particularly preferable to use disulphur dichloride to carry out the modification.

The amounts added of sulphur chlorides, preferably disulphur dichloride, are generally from 0.05 to 0.7 part by weight, preferably from 0.1 to 0.4 part by weight, for every 100 parts by weight of diene rubber.

The temperatures at which the modification takes place are usually from 20° C. to 150° C., preferably from 50 to 120° C.

In the claimed method, the sulphur chlorides pretreated with carboxylic acid, fatty acid and/or fatty acid ester are stirred with the polymer for about 5 to 60 minutes.

Conventional amounts of conventional stabilizers can be added to the polymer solution prior to work-up. Examples of stabilizers used are sterically hindered phenols, e.g. 2,6-di-tert-butyl-4,5-methylphenol, 4,6-bis(octylthiomethyl)-o-cresol or octadecyl 3-(3,5-di-tert-butyl-4-hydroxyphenyl) propionate or aromatic amines, such as N-(1,3-dimethylbutyl)-N'-phenyl-paraphenylenediamine or phosphites, e.g. tris(nonylphenyl)phosphite. It is also possible to use other commercially available stabilizers.

The polymers are isolated by evaporation to increase the concentration of the polymer solution, by precipitation with a non-solvent such as methanol, ethanol, or acetone, or preferably by steam-distillation of the solvent.

After steam-stripping, water is removed by using suitable sieve assemblies or suitable screw assemblies, for example expeller screws or expander screws or fluidized-bed dryers.

The drying process uses the conventional methods, e.g. in a drying oven or in a screw-conveyor dryer. The Mooney viscosity (ML 1+4 at 100° C.) of the high-molecular-weight polybutadiene produced by the claimed method is at least 50% higher after step 3) than the Mooney viscosity of the polybutadiene after step 2).

It is preferable that the initial Mooney viscosity of the claimed high-molecular-weight polybutadiene (NdBR) is at least 20 MU (ML 1+4 at 100° C.), preferably from 20 to 25 MU (ML 1+4 at 100° C.), particularly preferably at least 40 MU (ML 1+4 at 100° C.), and that after addition of sulphur chlorides, such as disulphur dichloride, sulphur dichloride and/or thionyl chloride, its final Mooney viscosity is at least 30 MU (ML 1+4 at 100° C.), preferably from 40 to 50 MU (ML 1+4 at 100° C.), particularly preferably from 60 to 80 MU (ML 1+4 at 100° C.), with no gelling or with significantly reduced gelling. Gel content is preferably smaller than 1% by weight.

Initial Mooney viscosity refers to the Mooney viscosity of the polybutadiene after the polymerization process.

It is equally possible to determine the step increase in Mooney value by using the Mooney stress relaxation in accordance with ASTM D1646-00 (MSR). Here, MSR values are measured after step 2) and step 3). The quotient calculated from MSR (2) and MSR (3) gives the modification coefficient. The MSR value is measured at 100° C. in accordance with the standard method of ASTM D1646-00.

The modification coefficient of the claimed polybutadiene is preferably from 1.3 to 2.5, with preference from 1.4 to 2.1.

The invention also comprises a high-molecular-weight neodymium-catalyzed polybutadiene obtainable by the claimed method.

It is preferable that the claimed high-molecular-weight neodymium-catalyzed polybutadiene comprises carboxylic acid, fatty acid and/or fatty acid ester. In particular, natural or modified, saturated or mono- or polyunsaturated vegetable or animal fatty acid esters, in particular epoxidized soya bean oil, or versatic acid, octanoic acid, isooctanoic acid, lauric acid, myristic acid, palmitic acid or oleic acid are detectable in the claimed neodymium-catalyzed polybutadiene. The person skilled in the art is aware of the conventional detection methods, for example using thin layer chromatography, gas chromatography, HPLC or mass spectroscopy; previous extraction/isolation of the carboxylic acid, fatty acid and/or fatty acid esters is optional.

The claimed high-molecular-weight neodymium-catalyzed polybutadiene needs no additions of extender oils, e.g. aromatic extender oils, in order to adjust the Mooney viscosity of the rubbers.

The claimed polybutadienes can be used alone, in a blend with aromatic or aliphatic oils or in a mixture with other rubbers. Additional rubbers suitable for producing rubber vulcanizates are not only natural rubber but also synthetic rubbers. Preferred synthetic rubbers are described by way of example in W. Hofmann, Kautschuktechnologie, Gentner Verlag, Stuttgart 1980 and I. Franta, Elastomers and Rubber Compounding Materials, Elsevier, Amsterdam 1989. They comprise inter alia BR—conventional polybutadiene ABR—butadiene/C1-C4-alkyl acrylate copolymers CR—polychloroprene
IR—polyisoprene
SBR—styrene/butadiene copolymers having styrene contents of from 1 to 60% by weight, preferably from 20 to 50% by weight
IIR—isobutylene/isoprene copolymers
NBR—butadienelacrylonitrile copolymers with acrylonitrile contents of from 5 to 60% by weight, preferably from 10 to 40% by weight
HNBR—partially hydrogenated or fully hydrogenated NBR rubber
EPDM—ethylene/propylene/diene copolymers
and also mixtures of the said rubbers. Materials of interest for the production of motor-vehicle tyres with the aid of surface-modified fillers are in particular natural rubber, emulsion SBR, and also solution SBR rubbers with a glass transition temperature above −50° C. optionally modified with silyl ethers or with other functional groups, as described in EP-A-0 447 066, polybutadiene rubber having high 1,4-cis content (>90% by weight) produced with Ni-, Co-, Ti- or Nd-based catalysts, and also polybutadiene rubber having from 0 to 75% by weight vinyl content, and also mixtures of these.

The rubber mixtures are also provided by the invention and generally comprise from 5 to 300 parts by weight of an active or inert filler, e.g.
  fine-particle silicas, produced by way of example via precipitation from solutions of silicates, or flame hydrolysis of silicon halides with specific surface areas of from 5 to 1000 $m^2/g$, preferably from 20 to 400 $m^2/g$ (BET surface area) and with primary particle sizes of from 10 to 400 nm. The silicas can, if appropriate, also take the form of mixed oxides with other metal oxides, such as the oxides of Al, of Mg, of Ca, of Ba, of Zn, of Zr, or of Ti,
  synthetic silicates, such as aluminium silicate, or alkaline earth metal silicate, such as magnesium silicate or calcium silicate, with BET surface areas of from 20 to 400 $m^2/g$ and primary particle diameters of from 10 to 400 nm,
  natural silicates, such as kaolin and any other naturally occurring form of silica,
  glass fibres and glass-fibre products (mats, strands), or glass microbeads,
  metal oxides, such as zinc oxide, calcium oxide, magnesium oxide, aluminium oxide,
  metal carbonates, such as magnesium carbonate, calcium carbonate, zinc carbonate,
  metal hydroxides, e.g. aluminium hydroxide, magnesium hydroxide,
  metal salts, e.g. the zinc or magnesium salts of [alpha], [beta]-unsaturated fatty acids, e.g. acrylic or methacrylic acid, having from 3 to 8 carbon atoms, examples being zinc acrylate, zinc diacrylate, zinc methacrylate, zinc dimethacrylate, and mixtures thereof;
  carbon blacks. The carbon blacks to be used here are those which are produced by lamp-black process, furnace-black process or gas-black process and which have BET surface areas of from 20 to 200 $m^2/g$, examples being SAF, ISAF, HAF, FEF or GPF carbon blacks,
  rubber gels, in particular those based on polybutadiene, butadiene/styrene copolymers, butadiene/acrylonitrile copolymers and polychloroprene.
Particular preference is given to zinc diacrylates, fine-particle silicas and carbon blacks.

The fillers mentioned can be used alone or in a mixture. In one particularly preferred embodiment, the rubber mixtures comprise, as fillers, a mixture of pale-coloured fillers, e.g. fine-particle silicas, and of carbon blacks, where the ratio of pale-coloured fillers to carbon blacks in the mixture is from 0.05 to 20, preferably from 0.1 to 10.

The form in which the fillers are added to the solution of the claimed polybutadiene(s) is preferably that of solids or of slurry in water or in a solvent. The rubber solution can be produced in advance, but it is preferable that the solution deriving from the polymerization reaction is used directly. The solvent is then removed thermally or preferably with the aid of steam. The conditions for the said stripping process can easily be determined through preliminary experimentation.

Preference is further given to addition of the fillers to the claimed solid polybutadiene or to a mixture of rubbers, and incorporation by mixing in a known manner, e.g. by using a kneader.

The claimed rubber mixtures also comprise crosslinking agents, if appropriate. Crosslinking agents used can comprise sulphur or peroxides, and sulphur is particularly preferred here. The rubber mixtures according to the invention can comprise further rubber auxiliaries, such as reaction accelerators, antioxidants, heat stabilizers, light stabilizers, antiozonants, processing aids, plasticizers, tackifiers, blowing agents, dyes, pigments, waxes, extenders, organic acids, retarding agents, metal oxides, and also activators, e.g. triethanolamine, polyethylene glycol, hexanetriol, etc., these being known to the rubber industry.

In the preferred rubber mixtures using high-activity precipitated silicas, it is particularly advantageous to use additional filler activators. Preferred filler activators are sulphur-containing silyl ethers, in particular bis(trialkoxysilylalkyl) polysulphides, as described in DE-A-2,141,159 and DE-A-2,255,577, oligomeric and/or polymeric sulphur-containing silyl ethers of DE-A-4,435,311 and EP-A-0 670 347, and mercaptoalkyltrialkoxysilanes, in particular mercaptopropyltriethoxysilane and thiocyanatoalkyl silyl ether, e.g. as described in DE-A-195 44 469.

The amounts used of the rubber auxiliaries are usual amounts, and depend inter alia on the intended use. Examples of usual amounts are amounts of from 0.1 to 50% by weight, based on rubber.

The further blending of the rubbers with the other rubber auxiliary products mentioned, crosslinking agents and accelerators can be carried out in the usual way with the aid of suitable mixing assemblies, such as rolls, internal mixers and mixing extruders.

The compounding and vulcanization processes are described in more detail by way of example in Encyclopedia of Polymer Science and Engineering, Vol. 4, pp. 66 ff (compounding) and Vol. 17, pp. 666 ff (vulcanization).

The rubber mixtures according to the invention can be vulcanized at usual temperatures of from 100 to 200° C., preferably from 130 to 180° C. (if appropriate under pressure of from 10 to 200 bar).

The claimed rubber mixtures have excellent suitability for producing mouldings of any type.

Non-limiting examples of the said mouldings are O-rings, profiles, gaskets, membranes, tyres, tyre treads, damping elements and hoses.

Particular preference is given to various tyre components and tyre treads.

The rubber mixtures according to the invention are moreover suitable for impact modifying thermoplastics, in particular for polystyrene and styrene/acrylonitrile copolymers.

The rubber mixtures are particularly suitably used for golf balls, in particular golf-ball cores.

The scope of the invention encompasses combinations of all of the moiety definitions, indices, parameters and explanations provided above and listed hereinafter in general terms or in preferred ranges, i.e. also encompasses any desired combination involving the respective ranges and preferred ranges.

Examples will be used below for further explanation of the invention.

I. Production of High-Molecular-Weight Neodymium-Catalyzed Polybutadienes (NdBR)

Various NdBRs were produced with a step increase in molecular weight.

COMPARATIVE EXAMPLE 1

NdBR with Small Step Increase <50% in Mooney Value, without Gelling

Polymerization Process:

8500 g of hexane (dried over molecular sieve), 1300 g of 1,3-butadiene, 21.4 mmol of a 20% solution of diisobutyl-aluminium hydride in hexane, 1.44 mmol of a 10% solution of ethylaluminium sesquichloride in hexane, and 1.44 mmol of a 40% solution of neodymium versatate in hexane were introduced into a dry, nitrogen-inertized 20 L steel autoclave. The system was heated to 73° C., with stirring, and the mixture was polymerized for 60 min, with stirring. A conversion sample was taken. Butadiene conversion after the polymerization process was 99.7%.

The polymerization process was terminated by addition of 3.75 g of stearic acid (0.25 phr), and 1.3 g of Irganox 1520 (0.1 phr) were used for stabilization. The solution was kept at 65° C. for a further 15 min.
Initial Mooney viscosity (ML 1+4 at 100° C.): 39 MU
Mooney Stress Relaxation (MSR at 100° C. in accordance with ASTM D1646-00): MSR (2)=0.64.
Modification:

720 g of the polymer solution were transferred into a 2 L glass reactor. For the modification process, 1.71 g of a solution of disulphur dichloride in hexane were added (concentration 11% (0.2 phr)). The solution was stirred at 65° C. for 15 min. The polymer was precipitated via introduction into 5 kg of ethanol, stabilized with Irganox 1520 (0.2 phr) and dried in vacuo at 70° C. Weight after drying: 95 g
Final Mooney viscosity (ML 1+4 at 100° C.): 44 MU;
Mooney stress relaxation MSR (3)=0.52;
Gel content <0.3% by weight
Microstructure: 97.5% by weight of 1,4-cis; 1.7% by weight of 1,4-trans; 0.8% by weight of 1,2-vinyl The high-molecular-weight neodymium-catalysed polybutadiene exhibits no gelling, with a small step increase in Mooney value of 12.8% above initial Mooney viscosity.

The modification coefficient (MC) is 1.2.

COMPARATIVE EXAMPLE 2

NdBR with High Step Increase in Mooney Value >50%, with Gelling

Polymerization Process:

8500 g of hexane (dried over molecular sieve), 1300 g of 1,3-butadiene, 21.3 mmol of a 20% solution of diisobutyl-aluminium hydride in hexane, 1.44 mmol of a 10% solution of ethylaluminium sesquichloride in hexane, and 1.44 mmol of a 40% solution of neodymium versatate in hexane were introduced into a dry, nitrogen-inertized 20 L steel autoclave. The system was heated to 73° C., with stirring, and the mixture was polymerized for 60 min, with stirring. A conversion sample was taken. Butadiene conversion after the polymerization process was 99.7%.

The polymerization process was terminated by addition of 6.5 g of stearic acid. The solution was kept at 65° C. for a further 15 min.
Initial Mooney viscosity (ML 1+4 at 100° C.): 36 MU
MSR (2)=0.77.
Modification:

720 g of the polymer solution were transferred into a 2 L glass reactor. For the modification process, 3.42 g of a solution of disulphur dichloride in hexane were added (concentration 11% (0.4 phr)). The solution was stirred at 65° C. for 15 min. The polymer was precipitated via introduction into 5 kg of ethanol, stabilized with Irganox 1520 (0.2 phr) and dried in vacuo at 7° C. Weight after drying: 95 g
Final Mooney viscosity (ML 1+4 at 100° C.): 82 MU;
MSR (3)=0.35;
Gel content 8.5% by weight
Microstructure: 97.6% by weight of 1,4-cis; 1.7% by weight of 1,4-trans; 0.7% by weight of 1,2-vinyl The high-molecular-weight neodymium-catalysed polybutadiene exhibits gelling amounting to 8.5% by weight, with a large step increase in Mooney value of 127.8% above initial Mooney viscosity.

The modification coefficient is accordingly 2.2.

INVENTIVE EXAMPLE 1

NdBR with High Step Increase in Mooney Value of 83%, Without Gelling

Polymerization Process:

8500 g of hexane (dried over molecular sieve), 1300 g of 1,3-butadiene, 29.2 mmol of a 20% solution of diisobutyl-aluminium hydride in hexane, 1.44 mmol of a 10% solution of ethylaluminium sesquichloride in hexane, and 1.44 mmol of a 40% solution of neodymium versatate in hexane were introduced into a dry, nitrogen-inertized 20 L steel autoclave. The system was heated to 73° C., with stirring, and the mixture was polymerized for 60 min, with stirring. A conversion sample was taken. Butadiene conversion after the polymerization process was 99.5%.

The polymerization process was terminated by addition of 6.5 g of stearic acid (0.5 phr). The solution was kept at 65° C. for a further 15 min.
Initial Mooney viscosity (ML 1+4 at 100° C.): 24 MU
MSR (2)=0.78.
Modification:

720 g of the polymer solution were transferred into a 2 L glass reactor. For the modification process, 1.24 g of a solution of disulphur dichloride in ESBO were added (concentration 54% (0.7 phr)). The solution was stirred at 65° C. for 15 min. The polymer was precipitated via introduction into 5 kg of ethanol, stabilized with Irganox 1520 (0.2 phr) and dried in vacuo at 7° C. Weight after drying: 95.2 g
Final Mooney viscosity (ML 1+4 at 100° C.): 44 MU;
MSR (3)=0.46;
Gel content <0.3% by weight
Microstructure: 97.4% by weight of 1,4-cis; 1.9% by weight of 1,4-trans; 0.6% by weight of 1,2-vinyl The modification coefficient is accordingly 1.7.

INVENTIVE EXAMPLE 2

NdBR with High Step Increase in Mooney Value of 55%, Without Gelling

Polymerization Process:

8500 g of hexane (dried over molecular sieve), 1300 g of 1,3-butadiene, 21 mmol of a 20% solution of diisobutylaluminium hydride in hexane, 1.44 mmol of a 10% solution of ethylaluminium sesquichloride in hexane, and 1.44 mmol of a 40% solution of neodymium versatate in hexane were introduced into a dry, nitrogen-inertized 20 L steel autoclave. The system was heated to 73° C., with stirring, and the mixture was polymerized for 60 min, with stirring. A conversion sample was taken. Butadiene conversion after the polymerization process was 98.7%.

The polymerization process was terminated by addition of 6.5 g of stearic acid (0.5 phr). The solution was kept at 65*C for a further 15 min.

Initial Mooney viscosity (ML 1+4 at 100° C.): 40 MU
MSR (2)=0.65.

Modification:

720 g of the polymer solution were transferred into a 2 L glass reactor. For the modification process, 0.40 g of a solution of disulphur dichloride in ESBO was added (concentration 64% (0.3 phr)). The solution was stirred at 65° C. for 15 min. The polymer was precipitated via introduction into 5 kg of ethanol, stabilized with Irganox 1520 (0.2 phr) and dried in vacuo at 70° C. Weight after drying: 95.1 g
Final Mooney viscosity (ML 1+4 at 100° C.): 62 MU;
MSR (3)=0.36;
Gel content <0.3% by weight
Microstructure: 97.4% by weight of 1,4-cis; 2.0% by weight of 1,4-trans; 0.6% by weight of 1,2-vinyl
Molar mass: Mn=202 kg/mol, Mw=418 kg/mol, Mz=1050 kg/mol; polydispersity (Mw/Mn)=2.07
Solution viscosity: 218 mPas The modification coefficient is accordingly 1.8.

INVENTIVE EXAMPLE 3

NdBR with High Step Increase in Mooney Value of 97%, Without Gelling

Polymerization Process:

8500 g of hexane (dried over molecular sieve), 1300 g of 1,3-butadiene, 21 mmol of a 20% solution of diisobutylaluminium hydride in hexane, 1.44 mmol of a 10% solution of ethylaluminium sesquichloride in hexane, and 1.44 mmol of a 40% solution of neodymium versatate in hexane were introduced into a dry, nitrogen-inertized 20 L steel autoclave. The system was heated to 73° C., with stirring, and the mixture was polymerized for 60 min, with stirring. A conversion sample was taken. Butadiene conversion after the polymerization process was 99.5%. The polymerization solution was not terminated and was directly further processed. A polymer sample was taken and the Mooney value of the polymer was determined.

Initial Mooney viscosity of prepolymer (ML 1+4 at 100° C.): 37 MU
MSR (2)=0.65.

Modification:

720 g of the polymer solution were transferred into a 2 L glass reactor. For the modification process, 0.76 g of a solution of disulphur dichloride in ESBO were added (concentration 37.5% (0.3 phr)). The solution was stirred at 65° C. for 15 min. The polymer was precipitated via introduction into 5 kg of ethanol, stabilized with Irganox 1520 (0.2 phr) and dried in vacuo at 70° C. Weight after drying: 95.1 g
Final Mooney viscosity (ML 1+4 at 100° C.): 73 MU;
MSR (3)=0.33;
Gel content <0.3% by weight
Microstructure: 97.7% by weight of 1,4-cis; 1.7% by weight of 1,4-trans; 0.6% by weight of 1,2-vinyl The modification coefficient (MC) is 1.97.

All of the NdBRs produced by the claimed method exhibit a large step increase in Mooney value. The final Mooney viscosities are more than 50% above the initial Mooney viscosity of the NdBR, with gel content <0.3% by weight.

Testing:

A: Determination of gel content of polybutadiene in styrene by gravimetric method based on the BAYELAS MO AQ 259-A LAB method:

25.0 g of polymer are weighed out with accuracy of 0.1 g on a laboratory balance. The edges are cut away and discarded before the procedure. The polymer is cut into small pieces. 850 ml of filtered styrene are charged to a 1 l wide-necked bottle, and the polymer is dissolved in about 4 hours on a shaker.

The wire netting composed of a wire cloth with mesh width 0.036 mm, Ø 50 mm, heated to red heat before the procedure, is cooled in a desiccator bottle in a desiccator. After cooling, the wire netting is removed from the desiccator bottle and weighed with accuracy 0.1 mg on an analytical balance. This gives the weight A. 100 ml of filtered styrene are provided in each of three glass beakers. The wire netting, diameter 50 mm, is placed in the "Gelman" metal filtration system (seal-filter-seal), and the funnel attachment is screwed into place.

The polymer solution is now poured through the filter. The first of the three glass beakers containing styrene is used to rinse the wide-necked bottle and this solution is likewise passed through the filter. The two other styrene portions are then used to rinse the filter.

The filter is then carefully removed with pincers and placed on a clean paper tissue. Pressure is carefully applied with the pincers to the edge of the filter. A lens is used to observe evaporation of styrene. The moist wire filter still wetted with styrene becomes visibly paler as the amount of styrene decreases. Once all of the filter meshes are free from styrene, it is immediately weighed again on the balance. This gives the weight B.

After the second weighing of the filter, it is dried in a drying cabinet for 15 minutes at 100° C. (±5° C.) in order to determine dry gel content. The filter here is in an open desiccator bottle. After drying, the bottle together with filter are placed in a desiccator for about 10 minutes and then reweighed. This gives the weight C.

Calculations:

$$\text{Wet gel} = \frac{(B-A)*10^6}{25} \text{ [ppm]}$$

$$\text{Dry gel} = \frac{(C-A)*10^6}{25} \text{ [ppm]}$$

$$\text{Swelling index} = \frac{\text{Wet gel}}{\text{Dry gel}} \text{ [dimensionless]}$$

B: Mooney viscosity and Mooney stress relaxation in accordance with ASTM D1646-00
C: Solution viscosity in accordance with ISO 3105:
  A Brookfield DV-I rotary viscometer is used to measure the viscosity of a 5.43% polymer solution in toluene at room temperature.
D: GPC was carried out by Currenta.
E: Microstructure determination.
  Currenta, ELA 101: A solution of the polymer in toluene is placed on a KBr window, the solvent is evaporated, and the polymer film is studied by means of FTIR spectroscopy between 2 KBr windows.
  ESBO: epoxidized soya bean oil from Cognis
  Irganox 1520: 4,6-bis(octylthiomethyl)-o-cresol from BASF II. Production of Rubber Mixtures and of Vulcanizates Comparative Example 2 is not suitable for a compound test because of very high gel content.

Rubber mixtures were produced comprising BUNA™ CB 22 as Nd-catalysed polybutadiene without step increase in Mooney value, and also the polymer from Comparative Example 1 and the claimed polymer from Inventive Example 2. Table 2 lists the mixture constituents. The mixtures were initially produced in a 1.5 L kneader without sulphur and accelerator. The mixture constituents sulphur and accelerator were then admixed at 40° C. on a roll.

The initial Mooney viscosity of the NdBR from Comparative Example 1 is 39 MU; the initial Mooney viscosity of the claimed NdBR from Inventive Example 2 is 39 MU. The Mooney viscosity of Buna CB22 without step increase in Mooney value is 63 MU.

The substances used for the mixture studies were as follows:

TABLE 1

| Trade name | Producer |
| --- | --- |
| BUNA ™ CB 22 as Nd polybutadiene | Lanxess Deutschland GmbH |
| CORAX N 326 as carbon black | Evonik Degussa GmbH |
| VIVATEC 500 as oil | Hansen und Rosenthal KG |
| ZINKWEIB ROTSIEGEL as zinc oxide | Grillo Zinkoxid GmbH |
| EDENOR C 18 98-100 as stearic add | Caldic Deutschland GmbH |
| VULKANOX 4020/LG as stabilizer | Lanxess Deutschland GmbH |
| VULKANOX HS/LG as stabilizer | Lanxess Deutschland GmbH |
| VULKACIT ® CZ/EGC as accelerator | Lanxess Deutschland GmbH |
| RHENOGRAN IS 60-75 as sulphur | RheinChemie Rheinau GmbH |
| TSR/RSS 3 DEFO 700 | Defo 700 natural rubber |

TABLE 2

| Constitution of the mixtures | | | | | | |
| --- | --- | --- | --- | --- | --- | --- |
| NdBR | CE1 | IE2 | CE2 | CE1* | IE2* | CE2* |
| Comparative Example 1 | 100 | | | 70 | | |
| Inventive Example 2 | | 100 | | | 70 | |
| Buna CB 22 | | | 100 | | | 70 |
| TSR/RSS 3 DEFO 700 | | | | 30 | 30 | 30 |
| CORAX N 326 | 50 | 50 | 50 | 50 | 50 | 50 |
| VIVATEC 500 | 4 | 4 | 4 | 4 | 4 | 4 |
| ZINKWEISS ROTSIEGEL | 2 | 2 | 2 | 2 | 2 | 2 |
| EDENOR C 18 98-100 | 3 | 3 | 3 | 3 | 3 | 3 |
| VULKANOX 4020/LG | 2 | 2 | 2 | 2 | 2 | 2 |
| VULKANOX HS/LG | 3 | 3 | 3 | 3 | 3 | 3 |
| VULKACIT CZ/EGC | 1.4 | 1.4 | 1.4 | 1.4 | 1.4 | 1.4 |
| RHENOGRAN IS 60-75 | 2.36 | 2.36 | 2.36 | 2.36 | 2.36 | 2.36 |

For assessment of compoundability, the milled sheets were evaluated before and after mixing to incorporate the rubber chemicals. Mixtures CE1 and CE1*, and also those of IE2 and IE2* according to the invention exhibited smooth milled sheets, whereas mixtures CE2 and CE2* with the unmodified Buna CB22 exhibited inhomogeneous milled sheets with very severe bagging and inadequate contact with the roll.

The following properties were determined on the vulcanizates in accordance with the stated standards:
DIN 53505: Shore A hardness at 23° C. and 70° C.
DIN 53512: Rebound resilience at 23° C. and 70° C. ("R23")
DIN 53504: Stress values at 10%, 25%, 50%, 100%, 200% and 300% elongation ($\sigma_{10}$, $\sigma_{25}$, $\sigma_{50}$, $\sigma_{100}$, $\sigma_{200}$ and $\sigma_{300}$), tensile strength and elongation at break
DIN 53516: Abrasion value
Eplexor equipment (Eplexor 500 N) from Gabo-Testanlagen GmbH, Ahlden, Germany was used to determine dynamic properties (temperature dependency of storage modulus E' in the temperature range from −60° C. to 0° C., and also tan δ at 60° C.). The values were determined in accordance with DIN 53513 at 10 Hz on cylindrical samples in the temperature range from −100° C. to +100° C. at a heating rate of 1 K/min. The measurements were made in compression mode with static compression of 1% and with dynamic deformation of 0.1%.

The method was used to obtain the following variables, the terminology here being in accordance with ASTM D5992-96.
E' (−60° C.): storage modulus at −60° C.
E' (−50° C.): storage modulus at −50° C.
E' (−40° C.): storage modulus at −40° C.
E' (−30° C.): storage modulus at −30° C.
E' (−20° C.): storage modulus at −20° C.
E' (−10° C.): storage modulus at −10° C.
E' (0° C.): storage modulus at 0° C.,
and also
tan δ (60° C.): loss factor (E"/E') at 60° C.

E' provides an indication of the grip of the tread of a winter tyre on ice and snow. As E' decreases, grip improves.

tan δ (60° C.) is a measure of hysteresis loss from the tyre under operating conditions. As tan δ (60° C.) decreases, the rolling resistance of the tyre decreases.

Table 3 shows the vulcanizate properties of the mixtures.

TABLE 3

| Vulcanizate properties | | | | | | | |
| --- | --- | --- | --- | --- | --- | --- | --- |
| Test | Unit | CE1 | IE2 | CE2 | CE1* | IE2* | CE2* |
| ML 1 + 4/100 | MU | 49.7 | 59.0 | 75.1 | 50.5 | 56.9 | 68.7 |
| ShA hardness @ 23° C. | | 59.5 | 60.4 | 61.6 | 58.0 | 59.1 | 60.3 |

TABLE 3-continued

| | | \multicolumn{6}{c}{Vulcanizate properties} | | | | | |
|---|---|---|---|---|---|---|---|
| Test | Unit | CE1 | IE2 | CE2 | CE1* | IE2* | CE2* |
| Tensile elongation | | | | | | | |
| S10 @ 23° C. | MPa | 0.5 | 0.5 | 0.6 | 0.5 | 0.5 | 0.5 |
| S300 @ 23° C. | MPa | 73 | 8.5 | 8.3 | 8.3 | 8.9 | 8.6 |
| S300/S10 | | 14.6 | 17 | 13.8 | 16.6 | 17.8 | 17.2 |
| MTS amplitude sweep @ 60° C. | | | | | | | |
| G* (0.5%) 1st measurement | | 1.91 | 1.89 | 1.91 | 1.94 | 1.88 | 1.98 |
| G* (15%) 1st measurement | | 1.16 | 1.19 | 1.22 | 1.12 | 1.12 | 1.19 |
| Tan d maximum | | 0.13 | 0.121 | 0.116 | 0.137 | 0.122 | 0.119 |
| Rebound resilience | | | | | | | |
| @ 60° C. | % | 63.3 | 64.6 | 65.7 | 61.8 | 63.3 | 62.0 |
| Dyn. damping, DIN 53513 | | | | | | | |
| E'(0° C.) | MPa | 10.37 | 9.43 | 9.34 | 12.42 | 10.67 | 12.54 |
| E' (23° C.) | MPa | 9.2 | 8.47 | 8.43 | 10.7 | 9.3 | 10.92 |
| E' (60° C.) | MPa | 8.34 | 7.83 | 7.85 | 9.19 | 8.19 | 9.56 |
| E''(0° C.) | MPa | 0.87 | 0.74 | 0.63 | 1.17 | 0.94 | 1.09 |
| E'' (23° C.) | MPa | 0.67 | 0.57 | 0.49 | 0.83 | 0.67 | 0.78 |
| E'' (60° C.) | MPa | 0.55 | 0.44 | 0.34 | 0.59 | 0.47 | 0.54 |
| E*(0° C.) | MPa | 10.41 | 9.46 | 9.36 | 12.47 | 10.71 | 12.59 |
| E* (23° C.) | MPa | 9.22 | 8.49 | 8.44 | 10.73 | 9.33 | 10.95 |
| E* (60° C.) | MPa | 8.36 | 7.84 | 7.86 | 9.21 | 8.21 | 9.58 |
| tan d (0° C.) | | 0.085 | 0.08 | 0.068 | 0.095 | 0.089 | 0.088 |
| tan d (23° C.) | | 0.073 | 0.068 | 0.059 | 0.078 | 0.073 | 0.072 |
| tan d (60° C.) | | 0.067 | 0.058 | 0.045 | 0.065 | 0.058 | 0.058 |
| Abrasion, DIN 53516 | | | | | | | |
| Abrasion value | mm³ | 13 | 12 | 15 | 29 | 29 | 33 |

In comparison with Comparative Examples CE1 and CE1*, IE2 and IE2* according to the invention exhibit a marked improvement in the indicators for low rolling resistance, for example high rebound resilience at 60° C., low tangent delta maximum in the MTS test at 60° C. and low tangent delta at 60° C. in the Eplexor test, better results in the tensile elongation test, discernible from a larger S300/S10 quotient, and also very good low values in the abrasion test.

In comparison with the unmodified Buna CB22 in Comparative Examples CE2 and CE2*, Inventive Examples IE2 and IE2* exhibit a marked improvement in processing quality, discernible from a noticeably smooth and homogeneous milled sheet and a completely satisfactory Garvey extrudate, while compound properties are comparably good.

FIG. 1 shows the Garvey extrudates from Comparative Example CE1, Inventive Example IE2 and Comparative Example CE2 (from top to bottom) at 90° C. and a rotation rate of 50 rpm.

CE1 and IE2 give smooth extrudates, whereas CE2 has a distinct saw-tooth profile.

Overall, it has been found that the claimed polymers with a large step increase in Mooney value of >50% can be used to produce mixtures that are easy to process and that give smooth extrudates, but that in terms of physical compound properties are equivalent to unmodified neodymium-catalysed polybutadiene rubbers which are difficult to process.

What is claimed is:

1. A method for achieving a step increase in Mooney viscosity in production of high-molecular-weight diene polymers having >95% by weight content of cis-1,4 units and <1% by weight 1,2-vinyl content, the method comprising:
 1) polymerizing at least one diene monomer selected from the group consisting of butadiene, and isoprene at temperatures of −20° C. to 150° C. in the presence of at least one inert, organic solvent and in the presence of at least one catalyst based on neodymium,
 2) terminating the polymerization by addition of protic compounds, and
 3) adding sulphur chlorides to the polymer, wherein, prior to adding, the sulphur chlorides are pre-treated with a carboxylic acid, fatty acid and/or fatty acid ester.

2. The method according to claim 1, comprising:
 a) catalyst production, with or without a preforming process, with use of catalyst systems based on neodymium, from a mixture composed of
  component A: an alcoholate or a carboxylate of neodymium,
  component B: a dialkylaluminium hydride,
  component C: a diene selected from the group consisting of butadiene, and isoprene, and
  component D: at least one organometallic halide,
 b) polymerization at a temperature of from −20° C. to 150° C.,
 c) use of protic compounds to terminate the polymerization, and
 d) addition of sulphur chlorides, where the sulphur chlorides are pre-treated with a carboxylic acid, fatty acid and/or fatty acid ester prior to addition.

3. The method according to claim 1, wherein the protic compounds comprise carboxylic acids and/or fatty acids.

4. The method according to claim 1, wherein the protic compounds comprise stearic acid or lauric acid.

5. The method according to claim 1, wherein the temperature at which the addition of the pretreated sulphur chlorides takes place is from 20° C. to 150° C.

6. The method according to claim 1, wherein a stabilizer is added.

7. The method according to claim 1, wherein the amount of sulphur chlorides added is from 0.05 to 0.7 part by weight for every 100 parts by weight of diene rubber.

8. The method according to claim 1, wherein the sulphur chlorides comprise disulphur dichloride, sulphur dichloride and/or thionyl chloride.

9. The method according to claim 1, wherein the quantitative ratio of sulphur chlorides or disulphur dichloride, sulphur dichloride and/or thionyl chloride to carboxylic acid, fatty acid and/or fatty acid ester is from 1:0.01 to 1:10.

10. The method according to claim 1, wherein the carboxylic acid comprises compounds from the group of the carboxylic acids having from 8 to 20 carbon atoms.

11. The method according to claim 1, wherein the fatty acid comprises saturated or mono- or polyunsaturated vegetable or animal fatty acids.

12. The method according to claim 1, wherein the fatty acid ester comprises natural or modified, saturated or mono- or polyunsaturated vegetable or animal fatty acid esters.

13. The method according to claim 1, wherein diene polymer obtained after step 3) exhibits a step increase of at least 50% in Mooney viscosity (ML 1+4 at 100° C.), based on the Mooney viscosity (ML 1+4 at 100° C.) of the diene polymer after step 2).

14. The method according to claim 1, wherein the Mooney viscosity (ML 1+4 at 100° C.) (initial Mooney viscosity) of the diene polymer after step 2) is at least 20 MU, and the Mooney viscosity (ML 1+4 at 100° C.) (final Mooney viscosity) of the diene polymer after addition of sulphur chlorides in step 3) is at least 30 MU where gel content is smaller than 1% by weight.

15. A high molecular weight neodymium-catalysed diene polymer obtained according to claim 1.

16. The high molecular weight neodymium-catalysed diene polymer according to claim 15, wherein the modification coefficient of the diene polymer is from 1.3 to 2.5, where Mooney stress relaxation is initially measured after step 2 (MSR (2)) and A after step 3 (MSR (3)) in accordance with ASTM D1646-00 and then the resultant quotient MSR (2)/MSR (3) gives the modification coefficient.

17. The high molecular weight neodymium-catalysed diene polymer according to claim 16, wherein the diene polymer comprises carboxylic acid, fatty acid and/or fatty acid ester.

18. The high molecular weight neodymium-catalysed diene polymer according to claim 17, wherein the diene polymer comprises natural or modified, saturated or mono- or polyunsaturated vegetable or animal fatty acid esters.

19. The high molecular weight neodymium-catalysed diene polymer according to claim 17, wherein the diene polymer comprises versatic acid, octanoic acid, isooctanoic acid, lauric acid, myristic acid, palmitic acid or oleic acid.

20. Rubber mixtures comprising a diene polymer according to claim 15.

21. A method for producing mouldings, the method comprising producing mouldings from the rubber mixtures according to claim 20.

22. A method for impact modification of thermoplastics, the method comprising producing thermoplastics from the rubber mixtures according to claim 20.

23. The method according to claim 2, wherein:
component A is neodymium versatate, component B is diisobutylaluminum hydride (DIBAH), component C is butadiene, and component D is ethylaluminium sesquichloride (EASC);
the diene polymer produced is polybutadiene;
the protic compounds are stearic acid or lauric acid;
the temperature at which the addition of the pretreated sulphur chlorides takes place is from 50° C. to 120° C.;
a stabilizer is added after the addition of sulphur chlorides;
the amount of sulphur chlorides added is from 0.1 to 0.4 parts by weight, for every 100 parts by weight of diene rubber;
the sulphur chlorides are disulphur dichloride, sulphur dichloride and/or thionyl chloride;
the carboxylic acid is versatic acid, octanoic acid or isooctanoic acid;
the fatty acid is lauric acid, myristic acid, palmitic acid or oleic acid;
the fatty acid ester is epoxidized soya bean oil; and
polybutadiene obtained after step 3) exhibit a step increase of at least 50% in Mooney viscosity (ML 1+4 at 100° C.), based on the Mooney viscosity (ML 1+4 at 100° C.) of the polybutadiene after step 2).

* * * * *